United States Patent
Zeng et al.

(10) Patent No.: US 9,035,225 B1
(45) Date of Patent: May 19, 2015

(54) MICROWAVE COOKWARE

(71) Applicants: Neilson Zeng, Toronto (CA); Weiyun Luo, Toronto (CA)

(72) Inventors: Neilson Zeng, Toronto (CA); Weiyun Luo, Toronto (CA)

(*) Notice: Subject to any disclaimer, the term of this patent is extended or adjusted under 35 U.S.C. 154(b) by 21 days.

(21) Appl. No.: 13/872,209

(22) Filed: Apr. 29, 2013

(51) Int. Cl.
   *H05B 6/80* (2006.01)
   *H05B 6/64* (2006.01)
   *B65D 81/34* (2006.01)
   *A47J 37/10* (2006.01)

(52) U.S. Cl.
   CPC .................................. *H05B 6/6494* (2013.01)

(58) Field of Classification Search
   CPC ....... A47J 27/002; A47J 36/06; A47J 36/027; Y10S 99/14
   USPC ......... 219/730, 725, 728, 729, 731, 733, 734, 219/400, 688, 682, 759; 426/107, 234, 243; 99/425, 448–450; 220/23.87, 62.15
   See application file for complete search history.

(56) References Cited

U.S. PATENT DOCUMENTS

| | | | |
|---|---|---|---|
| 3,985,990 A * | 10/1976 | Levinson | 219/729 |
| 3,985,991 A | 10/1976 | Levinson | |
| 4,106,486 A * | 8/1978 | Lee | 126/369 |
| 4,320,274 A | 3/1982 | Dehn | |
| 4,558,198 A | 12/1985 | Levendusky et al. | |
| 4,663,506 A * | 5/1987 | Bowen et al. | 219/730 |
| 4,701,585 A | 10/1987 | Stewart | |
| 4,870,233 A | 9/1989 | McDonald et al. | |
| 4,880,951 A * | 11/1989 | Levinson | 219/733 |
| 5,593,610 A | 1/1997 | Minerich et al. | |
| 5,961,872 A | 10/1999 | Simon et al. | |
| 7,582,852 B2 | 9/2009 | Cook et al. | |
| 2007/0090103 A1* | 4/2007 | France et al. | 219/400 |

FOREIGN PATENT DOCUMENTS

GB   2246949 A  *  2/1992

* cited by examiner

*Primary Examiner* — Quang Van

(57) ABSTRACT

A cookware system includes a microwaveable metal collecting pan, configured in a bowl shape with a plurality of elongated slots disposed thereon. The collector pan is positioned in a supporting bowl to catch dripping fluids and to provide a basin to hold water during steam cooking. A food item can be placed inside the pan, which is in turn placed inside the bowl and covered with a lid.

18 Claims, 4 Drawing Sheets

MICROWAVE COOKWARE

RELATED APPLICATIONS

Not applicable.

FIELD OF THE INVENTION

The present invention relates generally to cookware, and in particular, to microwavable cookware configured to receive electromagnetic radiation at a first wavelength of a microwave oven in air, convert oven radiation power to transmission power in foodstuffs in a targeted configuration with strong surface heating under a shorter second wavelength, and distribute the radiation having the first wavelength and the radiation having the second wavelength to foodstuffs in a targeted configuration.

BACKGROUND OF THE INVENTION

Microwave ovens are used daily for heating and cooking a variety of foodstuffs. Accompanying the increase in the use of microwave ovens is the various cookware used to contain the foodstuffs. Many different types of microwave safe cookware are known, each manufactured from microwave safe materials. Microwave ovens utilize microwave-type electromagnetic radiation to rotate and heat polarized molecules in foodstuffs. Microwave ovens heat foodstuffs quickly, efficiently, and evenly throughout. While microwave ovens are adequate at reheating cooked food, unfortunately, use of the microwave oven to prepare uncooked foods is not ideal.

Typically raw foodstuffs are cooked unevenly due to the dielectric heating accomplished with microwave ovens because excitation is fairly uniform only in the outer portions of a dense foodstuff, thus leading to overly dry outer portions and uncooked inner portions.

Accordingly, there exists a need for cookware by which the foodstuffs can be cooked in a microwave oven without the disadvantages as described above.

SUMMARY OF THE INVENTION

The inventor has recognized the aforementioned inherent problems and lack in the art and observed that there is a need for cookware for raw cooking foodstuffs in a microwave oven. The development of the present invention, which will be described in greater detail herein, substantially departs from conventional solutions to provide microwaveable cookware and in doing so fulfills this need.

In one (1) embodiment, the disclosed microwave cookware can include a collector pan configured to receive electromagnetic radiation at a first wavelength of microwave oven in air, convert oven radiation power to transmission power in foodstuffs in a targeted configuration with strong surface heating under a shorter second wavelength, and distribute the radiation having the first wavelength and the radiation having the second wavelength to foodstuffs in a targeted configuration.

In another embodiment, the disclosed microwave cookware can include a collector pan including a bottom surface, a continuous sidewall extending from a periphery of the bottom surface, a plurality of first slots disposed through the bottom surface, the plurality of first slots being configured to convert radiation power to transmission power in the collector pan such that foodstuffs will be heated in a targeted configuration under the shorter second wavelength entering the collector pan in resonance, and a plurality of second slots disposed though the sidewall, the plurality of second slots being configured to allow radiation having the microwave oven first wavelength to enter the collector pan.

In another embodiment, the disclosed microwave cookware can include a plurality of first slots, where each of the first slots includes a tapered rhombic shape having a length and a width, and wherein a strongest E-field strength is present at a middle area of the first slots and decays at both ends of the first slots.

In another embodiment, the disclosed microwave cookware can include a plurality of first slots, where a length of each of the plurality of first slots is determined by an effective wavelength of said electromagnetic radiation divided by an effective dielectric constant of a microwaveable foodstuff squared.

In another embodiment, the disclosed microwaveable cookware can include a susceptor board positioned on a collector pan, wherein the susceptor board includes a substrate body having a top surface and a bottom surface, a sputtered metalized material entirely covering at least the top surface, and a plurality of conical apertures disposed through the substrate body extending from the top surface to the bottom surface.

In another embodiment, the disclosed microwaveable cookware can include a bowl having an interior space, a collector pan positioned within the interior space of the bowl and configured to receive electromagnetic radiation having the first wavelength of microwave oven, convert radiation power to transmission power in the collector pan such that foodstuffs will be heated in targeted configuration by the shorter second wavelength, convert the radiation to a radiation having a second wavelength, and distribute the radiation having the first wavelength and the radiation having the second wavelength to foodstuffs in a targeted configuration, the collector pan having a flat bottom surface, a continuous sidewall extending from a periphery of the bottom surface, a plurality of equally spaced apart first slots disposed radially through the bottom surface, the plurality of first slots being configured to allow the radiation having the second wavelength to enter the collector pan in resonance, and a plurality of equally spaced second slots disposed though the sidewall, the plurality of second slots being configured to allow the radiation having the oven's first wavelength to enter the collector pan and positioned to radiate to the sides of the foodstuffs. A susceptor board lies on the collector pan for enhancing the crisp and brown of foodstuffs such as pizza, frozen fried dumplings (e.g., Guo Tie) as well as verity of meat. The susceptor board includes the heating top surface made from sputtered metalized film and laminated on the uncoated paperboard. A plurality of uniform spaced conical holes located at the specified regions of the susceptor board improves uniform surface heating of the foodstuffs. Conical venting holes provide driving of moisture (i.e., steam) during cooking as well as a thermal isolation between the susceptor board and metallic collector pan to enter the collector pan, and the susceptor board being positioned on the collector pan, the susceptor board having a substrate body with a top surface and a bottom surface, a sputtered metalized material entirely covering at least the top surface, and a plurality of equally spaced apart conical apertures disposed through the substrate body extending from the top surface to the bottom surface.

Furthermore, the described features and advantages of the disclosed microwaveable cookware can be combined in various manners and embodiments as one skilled in the relevant art will recognize after reading the present disclosure. The disclosure can be practiced without one (1) or more of the features and advantages described in any particular embodiment.

Further advantages of the present disclosure will become apparent from a consideration of the drawings and ensuing description.

BRIEF DESCRIPTION OF THE DRAWINGS

The advantages and features of the present disclosure will become better understood with reference to the following more detailed description and claims taken in conjunction with the accompanying drawings, in which like elements are identified with like symbols, and in which:

Figure 1:
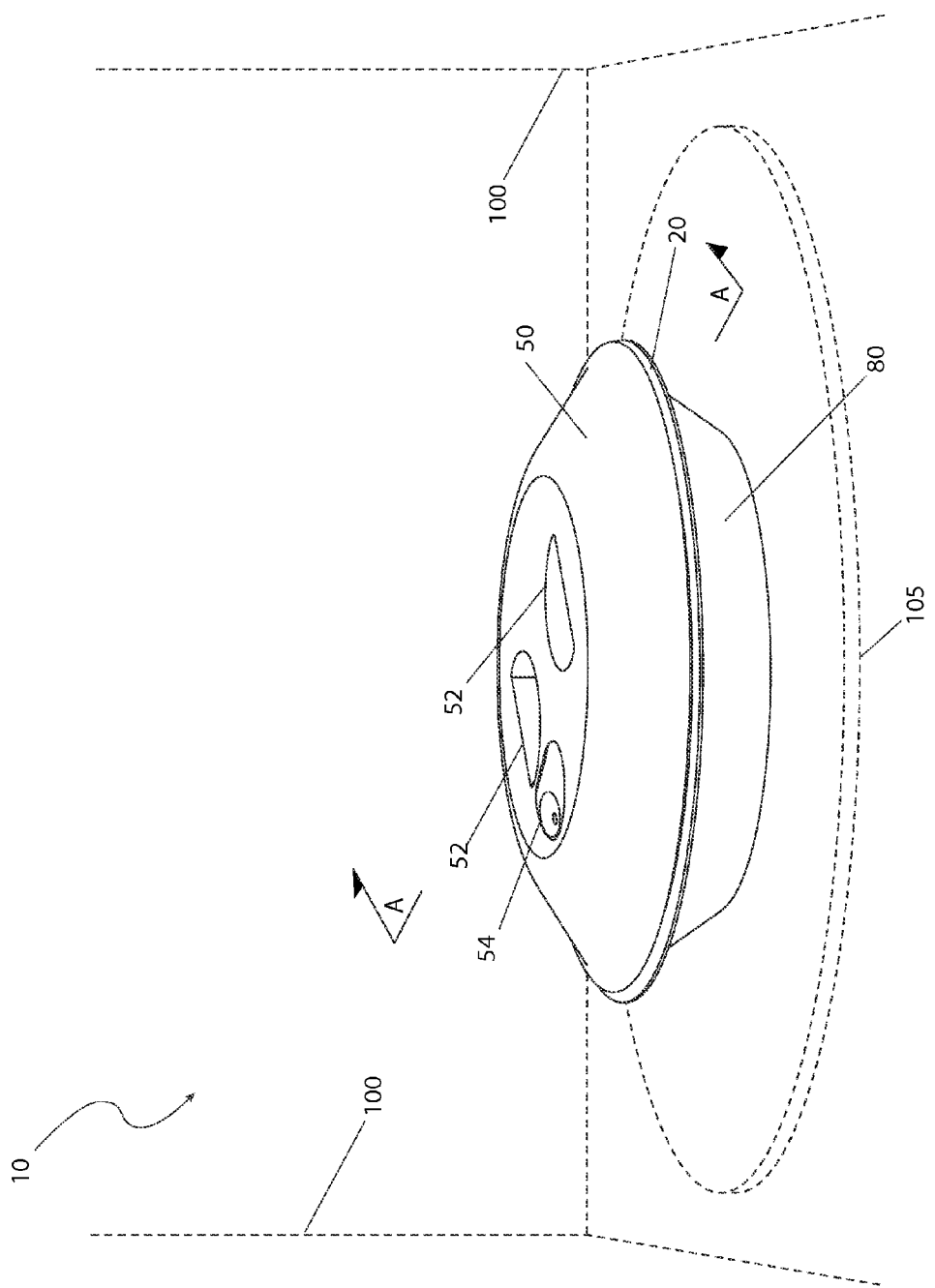
FIG. 1 is a perspective view of a microwave cookware system in accordance with the present invention.

DESCRIPTIVE KEY 10 microwave cookware
20 collector pan
22 collector bottom surface
24 collector side wall surface
26 collector rim
27 protection ring
30 first slot
32 second slot
34 third slot
50 cover
52 finger relief
53 cover rim
54 vent
60 susceptor board
61 paper substrate
62 top surface
64 conical aperture
80 bowl
82 bowl rim
100 microwave oven
105 pedestal
110 foodstuff

DETAILED DESCRIPTION OF THE PREFERRED EMBODIMENT

In accordance with the invention, the best mode is presented in terms of the described embodiments, herein depicted within FIGS. 1 through 4. However, the disclosure is not limited to the described embodiments and a person skilled in the art will appreciate that many other embodiments are possible without deviating from the basic concept of the disclosure and that any such work around will also fall under its scope. It is envisioned that other styles and configurations can be easily incorporated into the teachings of the present disclosure, and only certain configurations have been shown and described for purposes of clarity and disclosure and not by way of limitation of scope.

It can be appreciated that, although such terms as first, second, etc. may be used herein to describe various elements, these elements should not be limited by these terms. These terms are only used to distinguish one (1) element from another element. Thus, a first element discussed below could be termed a second element without departing from the scope of the present invention. In addition, as used herein, the singular forms "a", "an" and "the" are intended to include the plural forms as well, unless the context clearly indicates otherwise. It also will be understood that, as used herein, the term "comprising" or "comprises" is open-ended, and includes one (1) or more stated elements, steps or functions without precluding one (1) or more unstated elements, steps or functions. Relative terms such as "front" or "rear" or "left" or "right" or "top" or "bottom" or "below" or "above" or "upper" or "lower" or "horizontal" or "vertical" may be used herein to describe a relationship of one (1) element, feature or region to another element, feature or region as illustrated in the figures. It should be understood that these terms are intended to encompass different orientations of the device in addition to the orientation depicted in the figures. It should also be understood that when an element is referred to as being "connected" to another element, it can be directly connected to the other element or intervening elements may be present. In contrast, when an element is referred to as being "directly connected" to another element, there are no intervening elements present. It should also be understood that the sizes and relative orientations of the illustrated elements are not shown to scale, and in some instances they have been exaggerated for purposes of explanation.

Referring now to FIGS. 1 through 4, disclosing a microwave cooking system (herein referred to generally as a "system") 10, where like reference numerals represent similar or like parts. Generally, the system 10 includes cookware structures, which collectively provide a means to enhance a microwave heating process for the cooking of various foodstuffs 110. The system 10 expands the cooking functionality of conventional microwave ovens 100. Use of the system 10 results in improved cooking of foodstuffs 110 including such processes as pizza baking, raw meat crisping and roasting, and steam cooking of raw bread dough or raw vegetables. It can be appreciated that the teachings of the system 10 may be further utilized in the design and production of various multi-functional cookwares for use in microwave ovens.

Figure 2:
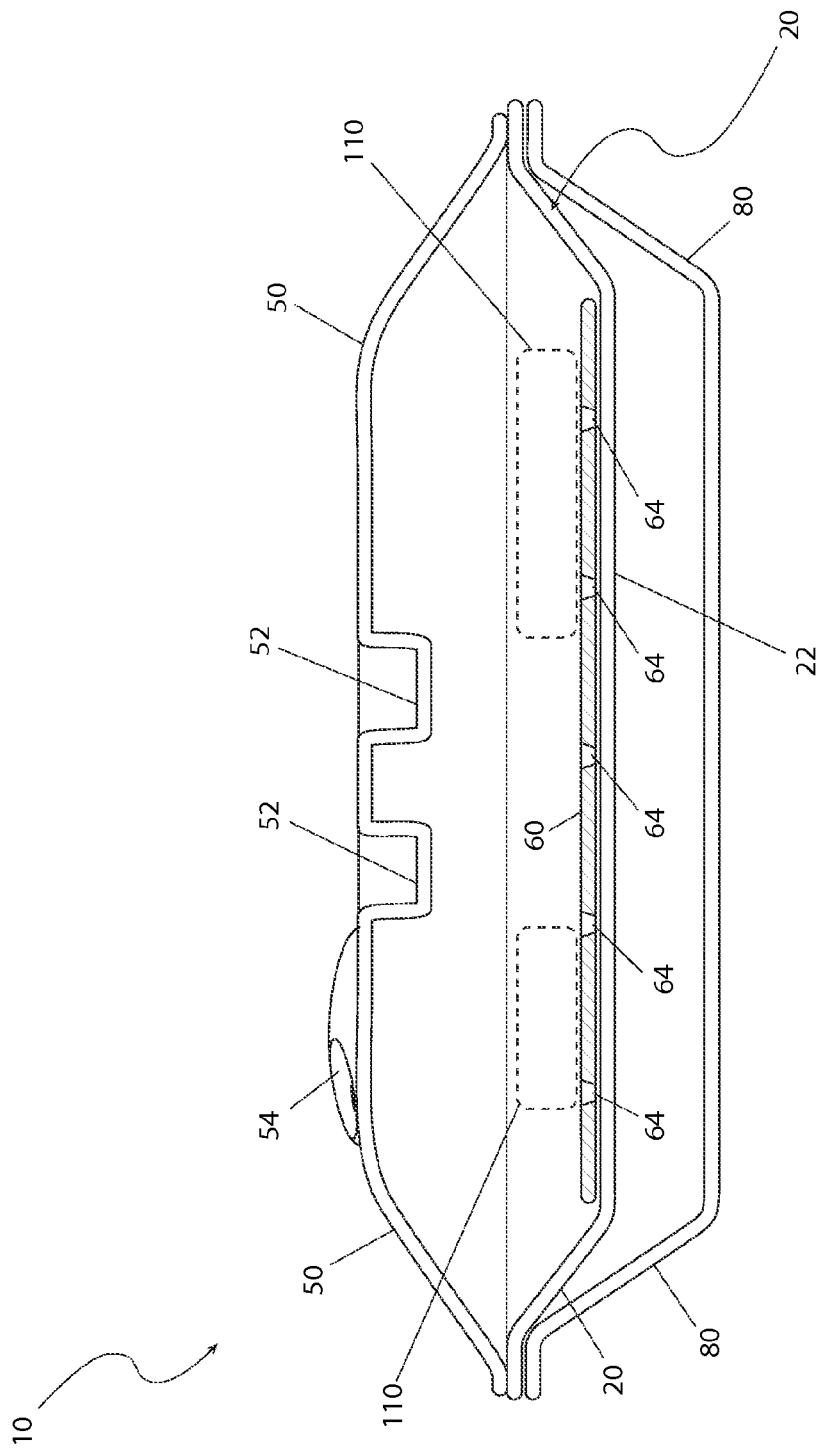
FIG. 2 is a section view of the microwave cookware system taken along section line A-A of FIG. 1.
Figure 3:
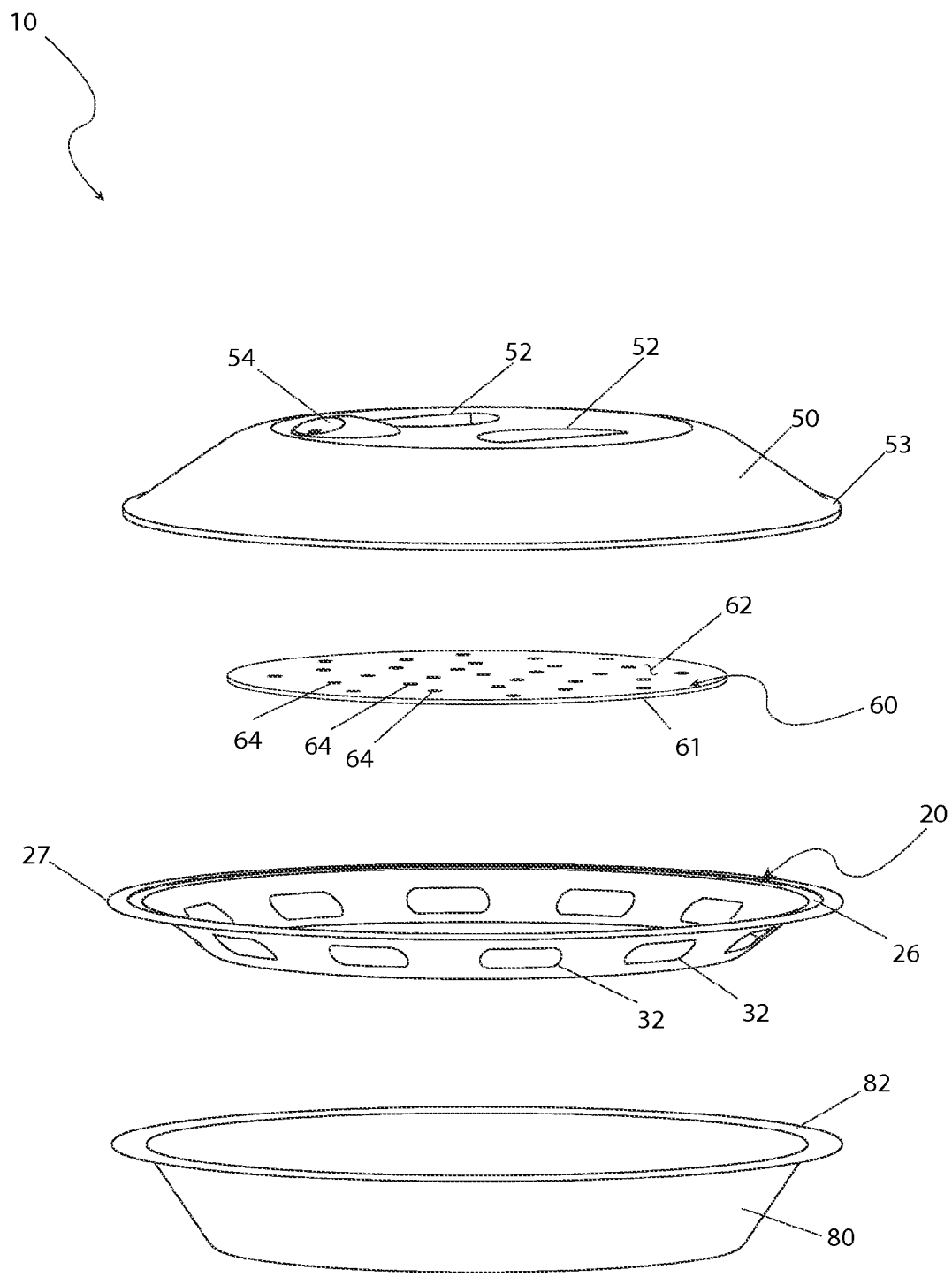
FIG. 3 is an exploded view of the microwave cookware system.

Referring to FIGS. 1-3, the system 10 can include a collector pan 20, a cover 50, a paper susceptor board 60 (FIGS. 2 and 3), and a bowl 80. The microwave cookware system 10 creates a specific heating environment and proper supply of energy suitable for various cooking processes such as, but not limited to: baking, crisping, roasting, steaming, and the like.

The system 10 is shown herein being approximately two-hundred millimeters (200 mm) in diameter; however, it can be appreciated that the system 10 may be introduced in a variety of sizes and cavity shapes (e.g., round, oval, square, rectangular or other geometric shapes) based upon configurations of various models of household microwave ovens 100 and other factors, such as stationery or pedestal cooking panel, and it should not be a limiting factor of the system 10. It can be appreciated that the shape and size of the glass bowl 80 and/or the metallic energy collector pan 20 can be designed and manufactured in various shapes, such as rectangular or square, to match a shape of a rotational base cavity disposed in a bottom surface of some microwave ovens 100. The previously described design principles of the E-field distribution within the collector pan 20 would be incorporated into various shaped and sized collector pans 20 based upon accompanying cookware items and specific microwave ovens 100.

The microwave energy collecting pan 20 of the cookware system 10 is designed to support necessary heating energy applied to a specific location of the foodstuff 110. The collecting pan 20 acts as an energy (e.g., microwave radiation) receiving antenna, which converts radiated energy into necessary heating energy being directed to the foodstuffs 110, thereby acting as an energy converter and distributor.

Referring to FIGS. 2 and 3, the vented adjustable cookware cover 50 is designed to provide necessary airborne particle containment and steam venting during various cooking processes of different foodstuffs 110. The cover 50 includes an upwardly tapering cylindrical construction having flat top and open bottom. A horizontally extending cover rim 53 is disposed along a bottom perimeter edge of the cover 50. The cover rim 53 rests upon a matching horizontally extending collector rim 26 disposed along a perimeter of the collector pan 20 (FIG. 3). The cover 50 is envisioned to be made using microwave-safe (e.g., BPA free) plastic or heat-resistant high borosilicate glass material. The cover 50 includes at least two (2) finger relief areas 52 along the flat top surface which allow convenient placement and removal of the cover 50 upon the collector pan 20 by a user. The cover 50 also includes at least one (1) vent 54 disposed in the flat top to allow the escape of steam, moisture, and expanding gasses during cooking. The cover 50 is envisioned to be made using a transparent microwave-safe plastic material.

The circular susceptor board 60 can be positioned between the foodstuffs 110 and the collector pan 20. The susceptor board 60 can be especially useful for cooking bread-type foodstuffs 110, such as pizza, fried dumpling (e.g., Guo Tie) and the like. The susceptor board 60 is suitably sized to contact and cover a bottom surface 22 of the collector pan 20 (FIG. 2). The susceptor board 60 includes a semi-rigid paper substrate 61 having a metalized top surface 62 and a plurality of equally-spaced conically-shaped apertures 64 (FIG. 3). The metalized top surface 62 can include a sputter deposited film of metallic particles similar sputtered metalized material entirely covering a top surface of a suitable substrate material. The susceptor board 60 can provide moisture steam, fluid drainage via the apertures 64 during cooking, as well as utilizing well known microwave reflection, absorption, and transmission properties of susceptor boards, thereby contributing enhanced surface thermal heating effect for crisping and browning at bottom of the cooking foodstuff. The susceptor board 60 works in conjunction with the collector pan 20 to enhance various cooking processes.

The susceptor board 60 is envisioned to be made using a conventional susceptor board material similar to the microwave heater and method of manufacture as disclosed in Turpin et al., U.S. Pat. No. 4,904,836, which is hereby incorporated herein by reference in its entirety. The conical apertures 64 can be added by a paper punching process. When combined with the energy converting and distributing properties of the collector pan 20, the susceptor board 60 can provide significant enhancement of the cooking process, being within the environment of elevated E-field strength via the effect of the collector pan 20. Additionally, the effect of the apertures 64 in providing a sufficient leaking path for condensing water helps particular foodstuffs 110, such as pizza, to avoid becoming soggy during the cooking process.

The bowl 80 supports the collector pan 20 in a subjacent manner having a horizontally extending bowl rim 82 along a perimeter which diametrically matches and contacts the collector rim 26 of the collector pan 20. The bowl 80 can contain a volume of water necessary for steam cooking of raw bread dough or raw vegetables. Additionally, the bowl 80 provides a receptacle for fluids secreted from the foodstuffs 110 during other cooking processes as the fluids escape downwardly through the susceptor board 60 and collector pan 20. The bowl 80 can be made of transparent high borosilicate tempered glass material similar to PYREX® glass and others, and being in variety shapes as mentioned above.

It can be appreciated that the system 10 encompasses in its broader aspect to fulfill roasting, baking, steam heating as well as defrosting of frozen foods using a household microwave oven with equal effectiveness.

Figure 4:
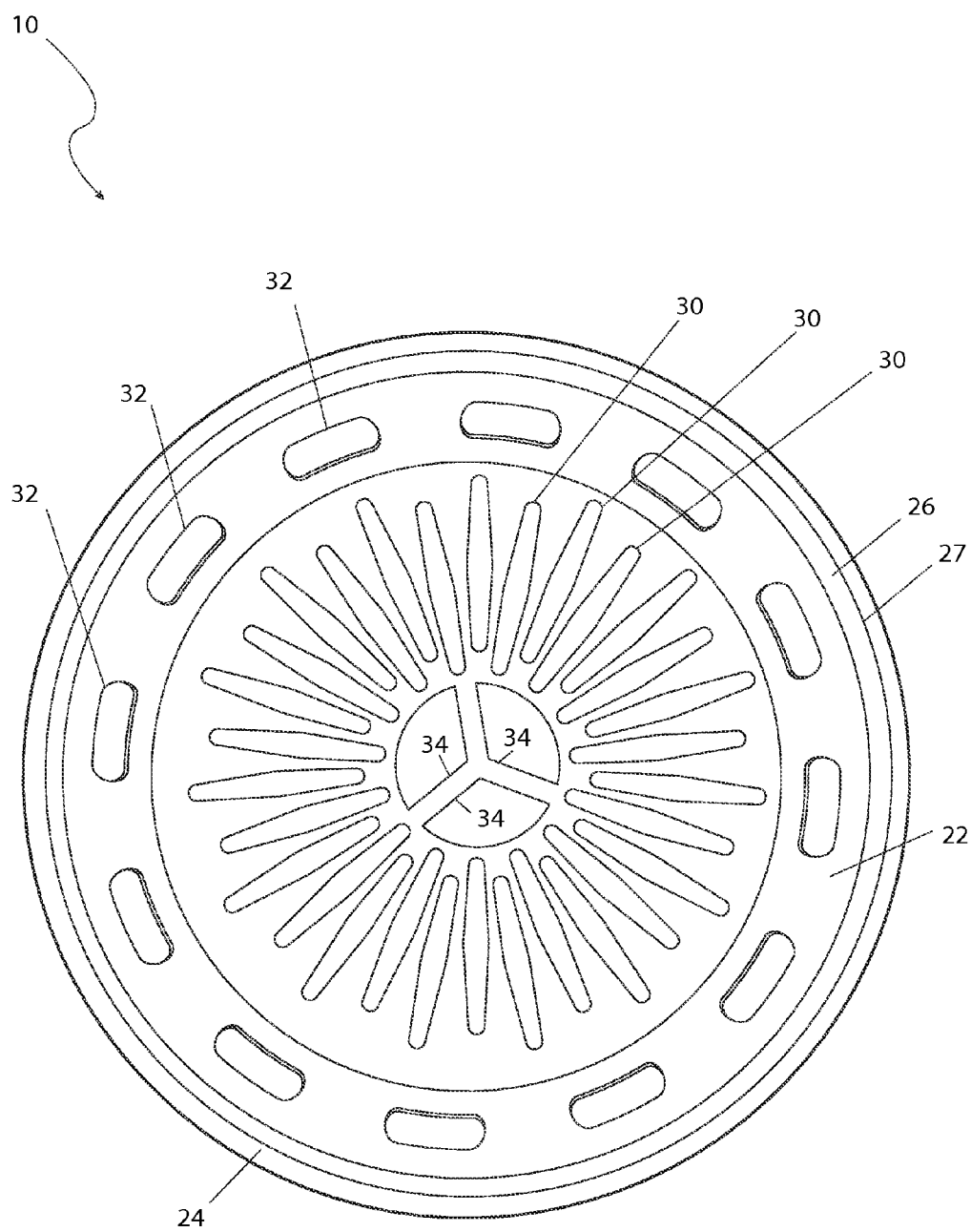
FIG. 4 is a top view of a collection pan of the microwave cookware system.

Referring now to FIG. 4, the system 10 creates a specific heating environment and proper supply of energy suitable for various cooking processes. The collecting pan 20 includes a bowl-shaped stainless steel structure being approximately two-hundred (200 mm) millimeters in diameter and having the collector bottom surface 22, a collector side wall surface 24 (FIG. 2), the collector rim 26, a plurality of first slots 30, a plurality of second slots 32, and a plurality of third slots 34.

The collecting pan 20 is designed to support necessary heating energy for application to the contained foodstuffs 110. The collecting pan 20 acts as a microwave energy receiving antenna, which in turn converts radiated energy from the magnetron of the microwave oven 100 into suitable heating energy, and directs it toward the foodstuffs 110, thereby acting as an energy converter and distributor. The energy collecting pan can be made from FDA approved food safety stainless steel or similar metallic materials having non-stick coatings. A silicon rubber protection ring 27, which can also be made from FDA approved silicon rubber material, is tightly covered on full surface of the collector rim. This protection ring 27 provides sufficient electrical and thermal protection against high E-field strength generated at the collection rim under microwave cooking.

The design of the first slots 30 provides necessary correction of the radiated energy to provide proper E-field strength. If utilizing an embodiment of the collector pan 20 having the diameter of two-hundred ten millimeters (210 mm), as illustrated herein, the length of the first slots 30 can be approximately forty-nine millimeters (49 mm) and is to be selected based on the idea of even heating performance.

The strongest E-field strength will be generated under the wave transmission condition in resonance. A half wavelength of a length dimension of the first slot 30 is used to provide resonance. During cooking, the first slot 30 can be covered with foodstuffs 110; therefore, the physical length of the first slot 30 "L" is designed based on the resonate transmission condition for cooking the foodstuff and calculated as demonstrated in Equation 01:

$$L = \frac{\lambda_{eff}}{2} \qquad \text{[Equation 01]}$$

Wherein $\lambda_{eff}$ is the effective wavelength of the transmission power directed toward the foodstuff and is calculated as $$\lambda_{eff} = \frac{\lambda_0}{\sqrt{\varepsilon_{eff}}},$$

$\lambda_0$ where is the wavelength of microwave oven radiation power in air; and $\varepsilon_{eff}$ is the effective dielectric constant of the media (e.g., foodstuff).

In conclusion, the length of each of the first slots 30 can selected based upon anticipated foodstuffs wall 110 and their corresponding dielectric constants ($\varepsilon_{eff}$) and a balanced consideration of cooking safety and effectiveness. The strongest E-field strength will present at the middle area of the first slot 30, while decaying at both ends of the slot 30. To avoid significant non-uniformity in heating strength on the first slots 30, the width along the first slot 30 can be selected with different values so that the shape of the first slot 30 is designed as a tapered rhombic. The first slots 30 can be machined or stamped through the collector bottom surface 22 and arranged in an equally-spaced radiating pattern, originating approximately twenty millimeters (20 mm) from a center point of the collector bottom surface 22, and extending outwardly.

A plurality of equally-spaced second slots 32 are arranged along a horizontal circle all around the collector side wall surface portion 24. Each second slot 32 is oval-shaped and approximately twenty-four millimeters (24 mm) in width and approximately eight millimeters high (8 mm) The function of the second slots 32 is to provide adequate microwave energy transmission into the collecting pan 20 being directed toward the foodstuffs 110, thereby being especially useful in a case of pizza baking so as to help avoid soggy pizza crust during cooking.

The third slots 34 include a plurality of machined or punched circle-segments arranged about a center of the collector bottom surface 22 which provide proper drainage of fluids and provide ventilation during cooking.

It is envisioned that other styles and configurations of the disclosed system 10 can be easily incorporated into the teachings of the present disclosure, and only certain particular configurations have been shown and described for purposes of clarity and disclosure and not by way of limitation of scope.

The disclosed system 10 can be installed and utilized by the user in a simple and effortless manner with little or no training After initial purchase or acquisition of the system 10, it can be installed and utilized as indicated in FIGS. 1-4.

The method of utilizing the system 10 to cook meat dishes may be achieved by performing the following steps: procuring a model of the system 10 having a desired diametrical size; placing portions of meat-type food stuffs 110 such as chicken, steak, or the like, onto the collector pan 20; placing the collector pan 20 onto the bowl 80; placing a wet (e.g., water soaked) paper towel on the bottom of the bowl 80 for the reason of safety and easy to clean the bowl; placing the cover 50 onto the collector rim 26 of the collector pan 20; placing the system 10 and contained foodstuffs 110 into the microwave oven 100; heating the system 10 at one-hundred (100%) percent power for approximately four minutes (4 min); removing the system 10 and foodstuffs 110 from the microwave oven 100; and serving the foodstuffs 110 in a normal manner; cooking additional portions of the meat-type foodstuffs 110 in like manner as needed. An optional cooking recommendation is to place the vented susceptor board 60 under the bottom of the cooking meat on the collector pan. The better crispness and browning of the cooked meat will be observed with helps of the vented susceptor board.

The method of utilizing the system 10 to cook bread-based dishes such as pizza may be achieved by performing the following steps: placing the susceptor board 60 into the collector pan 20; placing a correspondingly-sized pizza or similar foodstuff item 110 onto the collector pan 20; placing a wet (e.g., water soaked) paper towel on the bottom of the bowl 80 for the reason of bowl safety and easy to clean the bowl; in general no cover is needed for cooking pizza and fried dumpling (e.g., Guo Tie); placing the system 10 into the microwave oven 100, and cooking as previously described above.

The method of utilizing the system 10 to steam cook raw bread dough or raw vegetables within the microwave oven 100 may be achieved by performing the following steps: pouring approximately one-quarter (¼) of a liter of water into the bowl 80; placing foodstuffs 110, such as raw bread dough or vegetables, upon the collector pan 20; placing the collector pan 20 onto the bowl 80; placing the cover 50 onto the collector rim 26 of the collector pan 20; placing the system 10 and contained foodstuffs 110 into the microwave oven 100; and heating at one-hundred (100%) percent power for approximately five (5) minutes.

The foregoing embodiments of the disclosed microwave cookware have been presented for purposes of illustration and description. They are not intended to be exhaustive or to limit the invention and method of use to the precise forms disclosed. It can be appreciated by one skilled in the art that other styles, configurations, and modifications of the invention can be incorporated into the teachings of the present disclosure upon reading the specification and that the embodiments shown and described are for the purposes of clarity and disclosure and to limit the scope. The embodiments have been chosen and described in order to best explain the principles and practical application in accordance with the invention to enable those skilled in the art to best utilize the various embodiments with expected modifications as are suited to the particular use contemplated. The present application includes such modifications and is limited only by the scope of the claims.

What is claimed is:

1. Microwavable cookware comprising a collector pan configured to receive electromagnetic radiation at a first wavelength, convert said radiation to a power transmission having a second wavelength shorter than said first wavelength, and distribute said radiation having said first wavelength and said power transmission having second wavelength to foodstuff in a targeted configuration;
   wherein said collector pan comprises:
   a bottom surface;
   a continuous sidewall extending from a periphery of said bottom surface;
   a rim disposed around an upper end of said sidewall;
   a plurality of first slots disposed through said bottom surface, each comprising a tapered rhombic shape having a length and a width and configured to allow said power transmission having said second wavelength to enter said foodstuff through said slots and heat said foodstuff under a resonate condition;
   a plurality of second slots disposed though said sidewall, said plurality of second slots being configured to allow said power transmission having said second wavelength to enter said collector pan; and,
   a protection ring made of silicon rubber material covering an entirety of said rim;
   wherein said electromagnetic radiation at a first wavelength is microwave radiation from a microwave oven;
   wherein said protection ring provides sufficient E-field isolation against electric shock of said collector pan during operation in said microwave oven;
   wherein a strongest E-field strength is present at a middle area of said first slot and said E-field strength decays at both ends of said first slot;
   wherein said length of each of said plurality of the first slots is determined by half of an effective wavelength in said foodstuff; and,
   wherein said effective wavelength is determined by said first wavelength divided by the square root of an effective dielectric constant of said foodstuff.

2. The cookware of claim 1, wherein said length of each of said first slots is forty-nine millimeters.

3. The cookware of claim 1, wherein a length of each of said plurality of first slots is determined by said first wavelength of said electromagnetic radiation divided by two times a square root of an effective dielectric constant of a microwaveable foodstuff squared.

4. The cookware of claim 3, wherein said plurality of first slots is equally spaced apart and extend radially from a center point of said bottom surface.

5. The cookware of claim 1, wherein each of said plurality of second slots comprises an ovular shape having a length and a width.

6. The cookware of claim 5, wherein said plurality of second slots is equally spaced apart and extend circumferentially about said sidewall.

7. The cookware of claim 6, wherein said length of each of said plurality of second slots is twenty-four millimeters.

8. The cookware of claim 1, wherein said collector pan further comprises a plurality of third slots disposed through said bottom surface.

9. The cookware of claim 8, wherein each of said plurality of third slots comprises segmented circular shape.

10. The cookware of claim 9, wherein said plurality of third slots is equally spaced apart and extend radially from a center point of said bottom surface.

11. The cookware of claim 1, further comprising a bowl comprising an interior space configured to receive said collector pan.

12. The cookware of claim 11, further comprising a cover positioned over said bowl to fully enclose said collector pan within said interior space of said bowl.

13. The cookware of claim 1, further comprising a susceptor board positioned on said collector pan.

14. The cookware of claim 13, wherein said susceptor board comprises:
   a substrate body comprising a top surface and a bottom surface;
   a sputtered metalized material entirely covering at least said top surface; and,
   a plurality of conical apertures disposed through said substrate body extending from said top surface to said bottom surface.

15. The cookware of claim 14, wherein said substrate body comprises a semi-rigid paperboard.

16. Microwaveable cookware comprising:
   a bowl comprising an interior space;
   a collector pan positioned within said interior space of said bowl and configured to receive electromagnetic radiation at a first wavelength, convert said radiation to a transmission power having a second wavelength directed at foodstuffs in a targeted configuration, and distribute said radiation having said first wavelength and said transmission power having said second wavelength to foodstuffs in a targeted configuration, said collector pan comprising:
      a flat bottom surface;
      a continuous sidewall extending from a periphery of said bottom surface;
      a rim disposed around an upper end of said sidewall;
      a protection ring completely covering said rim;
      a plurality of equally spaced apart first slots disposed radially through said bottom surface, said plurality of first slots being configured to allow said power transmission having said second wavelength to enter foodstuff; and,
      a plurality of equally spaced second slots disposed though said sidewall, said plurality of second slots being configured to allow said microwave radiation having said first wavelength to enter said collector pan; and,
   a susceptor board positioned on said collector pan, said susceptor board comprising:
      a substrate body comprising a top surface and a bottom surface;
      a sputtered metalized material entirely covering at least said top surface; and,
      a plurality of equally spaced apart conical apertures disposed through said substrate body extending from said top surface to said bottom surface; and,
   a cover positioned over said bowl to fully enclose said collector pan and said susceptor board within said interior space of said bowl.

17. The cookware of claim 16, wherein each of said plurality of first slots comprises a tapered rhombic shape having a length and a width, and wherein a strongest E-field strength is present at a middle area of said first slot decays at both ends of said first slot, and wherein said length of each of said plurality of first slots is determined by half of an effective wavelength in said foodstuff; and said effective wavelength in the foodstuff is determined by dividing said first wavelength by the square root of an effective dielectric constant of said foodstuff.

18. The cookware of claim 17, wherein said bowl and said collector pan are suitably sized to be received by a base cavity of a microwave.

* * * * *